US007838462B2

(12) United States Patent
Kita et al.

(10) Patent No.: US 7,838,462 B2
(45) Date of Patent: Nov. 23, 2010

(54) CERAMIC SUPPORT CAPABLE OF SUPPORTING CATALYST, CATALYST-CERAMIC BODY AND PROCESSES FOR PRODUCING SAME

(75) Inventors: Hideki Kita, Aichi (JP); Jayaseelan Daniel Doni, Aichi (JP); Naoki Kondo, Aichi (JP); Shunkichi Ueno, Aichi (JP); Kazuhiko Koike, Aichi (JP); Keiichi Yamada, Aichi (JP); Tomohiko Nakanishi, Aichi (JP)

(73) Assignees: Denso Corporation, Kariya-shi (JP); Nippon Soken, Inc., Nishio-shi (JP)

( * ) Notice: Subject to any disclaimer, the term of this patent is extended or adjusted under 35 U.S.C. 154(b) by 1023 days.

(21) Appl. No.: 11/340,542

(22) Filed: Jan. 27, 2006

(65) Prior Publication Data

US 2006/0178265 A1    Aug. 10, 2006

(30) Foreign Application Priority Data

Jan. 28, 2005  (JP)  ............................. 2005-021777
Jan. 11, 2006  (JP)  ............................. 2006-004230

(51) Int. Cl.
*B01J 23/02* (2006.01)
*B01J 23/00* (2006.01)
*C04B 35/00* (2006.01)

(52) U.S. Cl. ........................ 502/439; 502/325; 501/95.3
(58) Field of Classification Search ................. 502/439; 501/95.3, 119
See application file for complete search history.

(56) References Cited

U.S. PATENT DOCUMENTS

2002/0039966 A1 * 4/2002 Tanaka et al. ............... 502/332

(Continued)

FOREIGN PATENT DOCUMENTS

EP    1043067 A2 * 10/2000

(Continued)

OTHER PUBLICATIONS

Zhu, Yan Qiu et al, Co-catalysed VLS Growth of Novel Ceramic Nanostructures, J. Mater. Chem., 2004, 14, pp. 685-689.*

(Continued)

*Primary Examiner*—Melvin C Mayes
*Assistant Examiner*—Michael Forrest
(74) *Attorney, Agent, or Firm*—Oblon, Spivak, McClelland, Maier & Neustadt, L.L.P.

(57) ABSTRACT

A needle-shaped ceramic body having as its base material a cordierite porous body having a high specific surface area and superior thermal shock resistance, and a needle-shaped catalyst-ceramic body are provided.

The present invention relates to a needle-shaped ceramic body having as its base material a needle-shaped cordierite in which the tips thereof are rounded, a needle-shaped catalyst-ceramic body loaded with a catalyst, and a method of production of a ceramic body in which a portion of a raw material (fluoride) gasified by a reaction between raw materials is grown into a needle like shape on the metal catalyst (Fe), wherein the tips of needle-shaped particles are rounded, using a vapor-liquid-solid (VLS) reaction, in a raw material burning process.

A honeycomb structure composed of the needle-shaped ceramic for supporting a catalyst is provided, in which decreases in specific surface area caused by sintering can be inhibited, and it enables early catalyst activation due to the low thermal capacity, and has low pressure loss.

33 Claims, 2 Drawing Sheets

U.S. PATENT DOCUMENTS

| | | | |
|---|---|---|---|
| 2003/0045422 A1* | 3/2003 | Tanaka et al. | 502/240 |
| 2003/0100446 A1* | 5/2003 | Hase et al. | 502/302 |
| 2003/0143370 A1* | 7/2003 | Noguchi et al. | 428/116 |
| 2004/0137214 A1* | 7/2004 | Chen et al. | 428/323 |
| 2007/0254804 A1* | 11/2007 | Daniel Doni et al. | 502/300 |

FOREIGN PATENT DOCUMENTS

| | | |
|---|---|---|
| JP | 5-50338 | 3/1993 |
| JP | 11-171537 | 6/1999 |
| JP | 2001-310128 | 11/2001 |
| JP | 2002-119870 | 4/2002 |
| JP | 2002-172329 | 6/2002 |
| JP | 2002-346383 | 12/2002 |
| JP | 2002-355511 | 12/2002 |
| JP | 2003-25316 | 1/2003 |
| JP | 2003-80080 | 3/2003 |
| JP | 2003-212672 | 7/2003 |
| JP | 2003-230838 | 8/2003 |
| JP | 2003-321280 | 11/2003 |

OTHER PUBLICATIONS

Wong et al., Nanobeam Mechanics: Elasticity, Strength, and Toughness of Nanorods and Nanotubes, Science, vol. 277, (1997), p. 1971-1975.*

* cited by examiner

CERAMIC SUPPORT CAPABLE OF SUPPORTING CATALYST, CATALYST-CERAMIC BODY AND PROCESSES FOR PRODUCING SAME

BACKGROUND OF THE INVENTION

1. Field of the Invention

The present invention relates to a needle-shaped ceramic body and a needle-shaped catalyst-ceramic body, and more particularly to a needle-shaped honeycomb catalyst-ceramic body capable of being preferably used at sites exposed to air flow of high temperatures in excess of 800° C. and high-speed such as three-way catalysts to be used in automobile for removing NOx, combustion catalysts to be used in gas turbine, and catalysts to be used for purification of high-temperature gas.

In the field of production technology for oxide-based honeycomb structures for supporting three-way catalysts to be used for automobile, the present invention is based on the strong need for the development of a cordierite porous body having a high specific surface area in which decrease in specific surface area caused by sintering can be suppressed even if exposed to high temperatures for long periods of time, and the present invention is useful for providing a needle-shaped ceramic body having as its base material a cordierite porous body that has a high specific surface area in which decrease in specific surface area caused by sintering can be suppressed even if exposed to temperatures in excess of 800° C. for long periods of time, processes for producing a novel cordierite porous body that enables the production of a honeycomb structure for supporting a catalyst formed directly with the cordierite porous body, and products thereof.

The present invention is characterized in that a porous cordierite composed of a porous structure in which needle-shaped crystals are linked three-dimensionally is used particularly as a honeycomb structure for supporting a catalyst, and thereby, the present invention can realize a needle-shaped ceramic body having a cordierite porous body as its base material, in which decreases in specific surface area caused by sintering can be suppressed, a honeycomb body with a cordierite sintered compact itself can be produced, the conventional process in which inside of a honeycomb structure is coated can be omitted, and also low-cost production processes thereof can be provided.

2. Description of the Related Art

Oxide-based honeycomb structures for supporting a catalyst have already achieved practical application in the sites such as, for example, three-way catalysts to be used for automobile and combustion catalysts to be exposed to high temperatures for long periods of time, and developments aiming the further improvement in their properties are aggressively progressed. In particular, since cordierite has a high melting point on the order of 1400° C., an extremely low coefficient of thermal expansion, and superior thermal shock resistance, its honeycomb structure is used at locations to be subjected to high temperatures in excess of 800° C. as a support for catalysts such as for example, three-way catalysts for automobile, combustion catalysts for gas turbines, and catalysts for high-temperature gas purification.

In this manner, although the usefulness of the cordierite as a catalyst support has been recognized, it was difficult to produce a cordierite porous body having a high specific surface area and thermal stability by the conventional methods for producing cordierite porous body. Consequently, catalyst-ceramic body loaded with a precious metal in which the cell wall surface of the ceramic support composed of a highly thermal shock resistant cordierite honeycomb structure is coated with gamma alumina have been widely used in the prior art as a catalysts for exhaust gas purification. This formation of a coating on the surface is because the specific surface area of the cordierite is too small for loading the cordierite with the required amount of catalyst components. Consequently, materials having a large specific surface area like the gamma alumina are used to increase the surface area of the ceramic support.

However, coating of the cell wall surface of the ceramic support with gamma alumina leads to an increase in thermal capacity due to the increase in weight. Although studies have been conducted in recent years to lower thermal capacity by reducing cell wall thickness of the support in order to achieve early catalyst activation, a formation of a coating on the surface diminishes the effect thereof considerably, and therefore, solution of these problems is requested as an important issue. In addition, the coating the surface with gamma alumina also had caused the problems that pressure loss of the support increases since the opening surface area of each cell is decreased, the coefficient of thermal expansion of the support increases as compared with that in the case of the cordierite only, and gamma alumina shifts to alpha alumina at high temperatures of 1000° C. or higher in which sintering progresses, thereby it is difficult to maintain a high specific surface area thereof.

The inventors of the present invention had previously succeeded in developing a cordierite porous body composed of needle-shaped crystals of cordierite having a submicron diameter, and proposed honeycomb structures using a cordierite porous body directly, and honeycomb structures in which the inner walls of a cordierite porous body was coated as honeycomb structures composed of a cordierite porous body (see Japanese Laid-open Patent Publication Nos. 2003-321280, 2003-212672, 2003-025316, 2002-355511, 2002-119870, 2002-172329, 2001-310128 and H11-171537/1999). In the case of using the cordierite at a site to be exposed to high temperatures, there have been no methods other than coating the inner walls of a honeycomb structure with gamma alumina and the like.

Consequently, various studies have been conducted on ceramic bodies capable of supporting catalyst components without forming a coating layer. For example, a method has been proposed in which the specific surface area of a cordierite itself is improved by an acid treatment and a followed heat treatment (see Japanese Patent Publication No. H05-050338/1993). However, this method was not practical since the strength of the cordierite is decreased due to destruction of the crystal lattice of the cordierite caused by the acid treatment and the heat treatment.

Therefore, the inventors of the present invention previously proposed a ceramic support capable of supporting a required amount of catalyst components without forming a coating layer in order to improve specific surface area (see Japanese Laid-open Patent Publication No. 2003-080080). This ceramic support is that one or more types of elements that constitute the base ceramic with an element other than a constituent element are substituted, and by immersing this ceramic support in a solution of a precious metal compound such as hexachloroplatinic acid, platinum (II) chloride or rhodium chloride and by followed burning thereof, a precious metal catalyst can be loaded directly on the substituent element. Accordingly, this support has higher strength and improved durability as compared with that of supports of the prior art in which vacancies are formed by carrying out the acid treatment and the heat treatment. In addition, a catalyst-ceramic body has been proposed as a ceramic support capable of direct loading of catalyst components, the catalyst-ceramic body has a resistance to thermal deterioration which is produced by loading a primary catalyst first and then loading a promoter in the direct loading of a primary catalyst component and promoter component on the surface of a support (Japanese Laid-open Patent Publication No. 2003-230838).

SUMMARY OF THE INVENTION

With the foregoing in view, as a result of earnestly conducting extensive research with the aim of developing a novel honeycomb structure of cordierite for supporting a catalyst capable of fundamentally solving the various above-mentioned problems of the prior art, the inventors of the present invention found that a needle-shaped crystalline phase is formed by growing a portion of gasified raw materials on a metal catalyst due to reactions between raw materials in a burning process, that a porous structure having a desired porosity can be fabricated in which the progression of sintering is more effectively inhibited than in the prior art by linking this needle-shaped crystalline phase three-dimensionally, that thereby the surface area thereof can be drastically improved, that decreases in specific surface area caused by sintering can be dramatically inhibited in which sintering progresses with difficulty even when heat treated at high temperatures since the entire bulk material is composed of a needle-shaped crystalline phase, and that a step such as the coating of gamma alumina onto the inner walls of a honeycomb structure according to the production methods of the prior art can be omitted, and further conducted additional research, and thereby the inventors completed the present invention.

An object of the present invention is to realize a catalyst-ceramic body having superior catalyst performance by using a ceramic support capable of directly supporting a catalyst component. In addition, a further object of the present invention is to provide a needle-shaped ceramic body having as its base material a novel cordierite having a high specific surface area in which specific surface area thereof can be suppressed even in the following heat treatment at 1000° C. or higher, a honeycomb structure thereof, their production methods and a needle-shaped catalyst-ceramic body as a product thereof.

The present invention for solving the above-mentioned problems is a ceramic body characterized by having a whisker grown needle-shaped crystalline phase comprising ceramic particles having a needle like shape in which at least a portion of the ceramic particles contain Si, Al and Mg, the needle-shaped ceramic particles compose of a tip having a spherical shape and a body portion that supports the tip, and the diameter of the tip having a spherical shape is larger than the diameter of the body portion. In addition, the present invention is a ceramic body characterized by having a whisker grown needle-shaped crystalline phase comprising ceramic particles having a needle like shape, and containing at least Si, Al and Mg as a coating layer on a portion or the entirety of the surface of the ceramic body, the tips of the needle-shaped ceramic particles are rounded. In addition, the present invention is a ceramic body characterized by having a whisker grown needle-shaped crystalline phase comprising ceramic particles having a needle like shape in which a portion or all of the ceramic particles contain at least Si, Al and Mg, and having at least pores or elements capable of directly supporting a catalyst component on the surface of ceramic particles of the ceramic body, the tips of the needle-shaped particles are rounded. In addition, the present invention is a ceramic body characterized by having a whisker grown needle-shaped crystalline phase comprising ceramic particles having a needle like shape, containing at least Si, Al and Mg as a coating layer on a portion or the entirety of the surface of the ceramic body, and having at least pores or elements capable of directly supporting a catalyst component on the surface of ceramic particles of the ceramic body, the tips of the needle-shaped ceramic particles are rounded. In addition, the present invention is a catalyst-ceramic body in which a catalyst component is supported onto the above-mentioned ceramic body. In addition, the present invention is a catalyst-ceramic body containing a promoter component in the above-mentioned ceramic body and/or the above-mentioned catalyst-ceramic body.

In addition, the present invention is a method of production of a ceramic body comprising using a raw material composed by compounds of $SiO_2$ and $Al_2O_3$ as silicon source, producing a ceramic body having a whisker grown needle-shaped crystalline phase composed of ceramic particles having a needle like shape in which a portion or all of the ceramic particles contain at least Si, Al and Mg, the tips of the needle-shaped ceramic particles are rounded. In addition, the present invention is a method of production of a ceramic body comprising molding a raw material having as its main components kaolin, talc, aluminum hydroxide or alumina and silica, and as additional components a fluoride and iron compound, and then burning it to produce a ceramic body having a whisker grown needle-shaped crystalline phase composed of particles having a needle like shape in which a portion or all of the ceramic particles contain at least Si, Al and Mg, the tips of the needle-shaped ceramic particles are rounded.

In addition, the present invention is a method of production of a catalyst-ceramic body comprising supporting a catalyst component onto the above-mentioned ceramic body. In addition, the present invention is a method of production of a catalyst-ceramic body comprising supporting a promoter component onto the above-mentioned ceramic body and/or the above-mentioned catalyst-ceramic body. Moreover, the present invention is a method of production of a catalyst-ceramic body comprising mixing a promoter component into ceramic raw materials of the above-mentioned ceramic body and/or the above-mentioned catalyst-ceramic body.

The following provides a detailed explanation of the present invention.

The present invention provides a ceramic body and catalyst-ceramic body, as well as production methods thereof, capable of reducing heat capacity and pressure loss and lowering the coefficient of thermal expansion without requiring coating of gamma alumina to increase specific surface area by making it possible to load a required amount of a catalyst component onto a ceramic support itself comprising a needle-shaped crystalline phase. A ceramic body of the present invention has as its base material a bulk cordierite porous body having a structure in which a needle-shaped crystalline phase, in which a portion of gasified raw materials are grown by a VLS mechanism on a metal catalyst due to a reaction between raw materials in a burning process to be intermingled three-dimensionally, and is composed of a cordierite porous body having a high specific surface area. Gasified raw materials of the present invention preferably contain fluorine, and iron or a compound thereof is preferably used for the metal catalyst.

An explanation is first provided of a needle-shaped ceramic body of the present invention. In the present invention, a starting powder blended so as to have a cordierite composition is used as the starting substance. For example, kaolin, talc, alumina or silica powder is used for the starting substance, and these are weighed and blended so as to have a cordierite composition. At this time, a metal catalyst for growing a portion of gasified raw materials into a needle-shaped form, and a fluorine-containing substance for gasifying the raw materials are blended in the burning process. In addition, a needle-shaped additive such as an alkaline earth metal oxide like strontium oxide (SrO) at 2% by weight or less, or a rare earth oxide at 5% by weight or less, can be added to facilitate whisker growth. Moreover, a substance that disappears in the sintering process (pore forming agent), such as carbon black at 10 to 30% by weight, can be added to increase the porosity after sintering the sintered compact. As a result, in addition to being able to obtain a sintered compact having porosity of, for example, 38 to 55%, spaces are formed for the growth of needle-shaped crystal, thereby increasing the amount of needle-shaped crystal formed.

In the present invention, a mixed powder of the above-mentioned starting powder and additives are mixed with, for example, a ball mill, the resulting mixed slurry is dried with an evaporator or oven, the resulting dried product is crushed and sized, and this powder is press-molded and then sintered at 1200 to 1400° C. As a result, a cordierite bulk material having a submicron cordierite needle-shaped crystalline phase can be fabricated.

The cordierite ceramic body of the present invention has a large amount of needle-shaped particles with rounded tips, and is able to improve specific surface area by linking these needle-shaped particles three-dimensionally. As a result of having needle-shaped particles with rounded tips, the cordierite ceramic body of the present invention exhibits advantages such that the required amount of catalyst component can be loaded and specific surface area due to the progression of sintering can be suppressed. In the fabrication of a ceramic body of the present invention, a compound containing alumina and silica such as kaolin is suitable as raw material particles serving as the silicon source. Minerals of a composition having alumina and silica such as kaolin ($Al_2Si_2O_5(OH)_4$) are particularly preferable as a raw material component for producing cordierite of the present invention.

A fluorine-containing substance is blended when producing the cordierite ceramic body of the present invention. This fluorine-containing substance reacts with other raw materials such as alumina and silicon dioxide in the burning process to form volatile fluorides. These fluorides having a high vapor pressure make it possible to quickly form a large amount of needle-shaped particles having a large aspect ratio by directly growing in needle-shaped crystal on a metal catalyst. Examples of fluorine-containing substances used in the present invention include $SrF_2$, $AlF_3$ and $BiF_3$, and preferably 1 to 5% by weight, and particularly preferably 1 to 2% by weight, of these fluorides are contained in the raw materials. For example, in the case of fabricating a ceramic body of the present invention by burning at 1350° C. a raw material powder containing alumina and silicon dioxide in the raw materials and blended with $SrF_2$, the $SrF_2$ reacts with the $Al_2O_3$ and $SiO_2$ to form $AlOF$ and $SiF_4$. Since these compounds have a high vapor pressure, although they grow directly as crystal on the ceramic body, they form needle-shaped particles at this time.

It is preferable that a metal catalyst is preferably present when forming these needle-shaped particles. Preferable examples of metal catalysts include Mn, Fe, Co, Ni and Cu, and in the burning process, for example, products such as $AlOF$ and $SiF_4$ formed as a result of $SrF_2$ reacting with $Al_2O_3$ and $SiO_2$ at a high temperature form needle-shaped crystal on the metal catalyst by a vapor-liquid-solid (VLS) mechanism. During the formation of these needle-shaped particles, the presence of the metal catalyst promotes the growth of needle-shaped particles. In the present invention, a metal catalyst is preferably blended at 0.5 to 1.0% by weight, and particularly preferably at 0.5 to 0.7% by weight, as, for example, iron oxide, in the raw materials. If the blended amount deviates from this range, the action and effects of the catalyst decrease resulting in the problem of preventing the formation of a large amount of needle-shaped particles in which their needle-shaped shape has developed. In the present invention, although a metal catalyst is typically introduced into the ceramic body either by blending a metal-containing substance having catalytic action into the raw materials, or by providing a separate loading step for that purpose, metal impurities contained in the raw material substances can also act as a catalyst. Needle-shaped particles having rounded tips of the present invention that have been formed in this manner contain a metal such as Fe on their tips that is used as a catalyst. This is because needle-shaped particles having a large aspect ratio form as a result of growing while leaving Fe on their tips as the voltage raw materials that have reacted with fluorine accumulate and react.

In the present invention, by adjusting the blended amounts of the fluorine-containing substance and metal catalyst in the raw materials, the particulate form such as the aspect ratio of the needle-shaped particles of the ceramic body formed, their amount formed and their formation rate and so forth can be controlled, thereby making it possible to obtain a ceramic body having superior properties. In the case of using, for example, $SrF_2$ as the fluorine-containing substance, although elemental fluorine contained in the substance substantially volatilizes in the burning process and ultimately does not remain in the ceramic body, the metal component in the form of Sr remains in the ceramic body by forming various forms corresponding to the conditions of the burning process and so forth.

In the production of the ceramic body of the present invention, after blending a fluorine-containing substance, metal catalyst and additive for facilitating needle like shape and so forth into a ceramic raw material such as highly pure kaolin, talc, alumina or silica powder so as to have a cordierite composition for use as the starting substance, the ceramic body is typically produced by burning at 1200 to 1400° C. into a honeycomb shape and so forth. However, as an example of another production method, a ceramic body having needle-shaped particles of the present invention can be produced by coating, for example, a slurry containing kaolin onto the surface of a sintered compact by immersion, drying and burning so as to grow a needle-shaped ceramic body on the surface of the sintered compact by using the kaolin as a portion of the raw materials. At this time, the fluorine-containing substance or metal catalyst can be blended into the slurry. Preferable examples of slurries containing kaolin include those containing kaolin, aluminum hydroxide and silica, and by coating this slurry onto the surface of a cordierite sintered compact followed by burning, needle-shaped particles of cordierite are formed on the coating layer by a vapor-liquid-solid (VLS) mechanism.

In the production of a ceramic body of the present invention, it is preferable to blend a crystallization temperature-lowering agent such as boron oxide to promote the development of needle-shaped particles at as low a temperature as possible. In addition, it is also preferable to blend an additive for causing the crystal grains to develop a needle like shape (additive for facilitating needle like shape). At least one type selected from a lanthanoid element, transition metal element, alkaline metal element and alkaline earth metal element is used for the additive, and more specifically, strontium oxide is used preferably. A method for producing a cordierite porous body having a high specific surface area is known that comprises forming a silica layer on a cordierite polycrystal and then making the silica layer porous. However, cordierite polycrystals having a high specific surface area reported thus far are polycrystals separated by a grain boundary layer, and their specific surface area is known to decrease considerably due to, for example, the progression of sintering resulting from heat treatment at 1050° C.

The present invention preferably has at least pores or elements capable of directly supporting a catalyst component on the surface of the above-mentioned ceramic particles in the above-mentioned needle-shaped ceramic body. Namely, in the present invention, a ceramic support is preferably used that has pores having a diameter or width that is 1000 times or less, and preferably 1 to 1000 times, the diameter of catalyst component ions loaded on the surface of the ceramic body, and the number of those pores is $1 \times 10^{11}$/L or more, preferably $1 \times 10^{16}$/L or more, and more preferably $1 \times 10^{17}$/L or more. More specifically, these pores are formed by defects such as oxygen defects or lattice defects in the ceramic crystal, fine cracks formed in the ceramic surface, or deficiency of an element that constitutes the ceramic. Although at least one type of these pores should be formed in the ceramic support, they can also be formed by combining a plurality of types.

In the present invention, a cordierite honeycomb structure containing as its main component a cordierite represented by the theoretical composition $2MgO.2Al_2O_3.5SiO_2$ and having a honeycomb form for the shape of the support is preferably used as the ceramic support. Since the diameter of catalyst component ions is normally about 0.1 nm, the diameter or width of the pores formed in the surface of the cordierite honeycomb structure is preferably 1 to 1000 times that diameter, or 0.1 to 100 nm, while the depth of the pores is preferably ½ times or more the diameter of the catalyst component ions, namely 0.05 nm or more. As a result of having at least the above-mentioned predetermined number of such pores, the ceramic support is able to directly load a catalyst component while securing the required strength.

In the case the ceramic support has pores comprised of oxygen defects or lattice defects, since the number of pores is intimately related to the amount of oxygen in the cordierite honeycomb structure, in order to attain the above-mentioned predetermined number of pores, the amount of oxygen of the cordierite honeycomb structure is made to be less than 47% by weight or greater than 48% by weight. In addition, the lattice constant of the $b_0$ axis of the crystal axes of the cordierite crystal should be greater than 16.99 or less than 16.99. More specifically, if the cordierite honeycomb structure contains $4 \times 10^{-6}$% or more, and preferably $4 \times 10^{-5}$% or more, of cordierite crystals having one or more of at least one type of oxygen defect or lattice defect in a unit crystal lattice, or if it contains $4 \times 10^{-8}$ or more, and preferably $4 \times 10^{-7}$ or more, of at least one type of oxygen defect or lattice defect per unit crystal lattice of the cordierite, then the number of pores of the ceramic support becomes $1 \times 10^{16}$/L or more, and preferably $1 \times 10^{17}$/L or more.

In general, in the case of loading a catalyst component, catalyst component ions are dissolved in a solvent, and a ceramic support is immersed in this solvent. In the case of cordierite honeycomb structures coated with gamma alumina of the prior art, although the pore diameter of the gamma alumina on which the catalyst component is loaded is normally about 2 nm, the catalyst metal particles are normally about 5 nm, making them larger than the pore diameter of the gamma alumina. This being the case, the gamma alumina pores are considered to be necessary for retaining the catalyst component ions during catalyst loading rather than for retaining the catalyst metal particles. If the pores have a diameter or width that is equal to or greater than the diameter of the catalyst component ions, namely if the pores have a diameter or width of 0.1 nm or more, they are able to retain catalyst component ions. However, in order to ensure the strength of the honeycomb structure, it is necessary for the diameter or width of the pores to about 1000 times or less the diameter of the catalyst component ions, and in the case of a diameter of 0.1 nm, this means that the diameter or width of the pores is 100 nm or less. In addition, catalyst component ions can be retained if the depth of the pores is ½ times or more the diameter of the catalyst component ions that are loaded.

Since it is not possible to measure specific surface area using ordinary methods since pores comprised of defects or cracks are extremely fine, in the present invention, the number of pores required to load a predetermined amount of catalyst component is defined. The amount of catalyst metal loaded onto a currently used three-way catalyst is roughly 1.5 g per liter of volume of a honeycomb structure. The diameter of the catalyst metal particles is required to be about 1000 nm, and preferably smaller than about 20 nm, for the catalyst metal to demonstrate exhaust gas purification performance.

If 1.5 g/l of platinum, which is the same as in currently used three-way catalysts, is assumed to be loaded, and the diameter of the platinum particles is assumed to be 1000 nm for all particles, then the number of loaded platinum particles is $1.34 \times 10^{11}$/L, while if the diameter of the platinum particles is assumed to be 20 nm, then the number of loaded platinum particles is $1.67 \times 10^{16}$/L. Since roughly one pore is required per catalyst metal particle to load the catalyst metal, the number of pores required to directly load catalyst metal particles is at least $1 \times 10^{11}$/L or more, and preferably $1 \times 10^{16}$/L or more. In addition, if the mean diameter of the catalyst metal particles is assumed to be about 10 nm for all particles, then the purification performance is equivalent to a three-way catalyst. The number of catalyst metal particles at this time is $1.34 \times 10^{17}$/L, and the required number of pores is preferably $1 \times 10^{17}$/L or more.

On the other hand, the weight of a cordierite honeycomb structure having a cell wall thickness of 100 µm and cell density of 400 cpsi (cells per square inch) is about 230 g per liter of volume. If this is assumed to be entirely comprised of cordierite ($Mg_2Al_4Si_5O_{18}$), then the number of cordierite crystals is such that the ratio of crystals having defects to all of the cordierite crystals is $4 \times 10^{-5}$% in the case of $1 \times 10^{17}$ defects assuming that the number of oxygen defects or lattice defects in the cordierite honeycomb structure is $1 \times 10^{16}$/L and only one defect is formed per crystal.

The number of defects contained per cordierite crystal is also such that the number of defects per unit crystal lattice is $4 \times 10^{-8}$ in case of $1 \times 10^{16}$ defects/L, while the number of defects per unit crystal lattice is $4 \times 10^{-7}$ in the case of $1 \times 10^{17}$ defects/L.

In the present invention, in order to impart catalyst loading ability to the cordierite honeycomb structure, pores are formed by methods such as (1) forming oxygen defects or lattice defects (metal vacancies, lattice strain) in the cordierite crystal lattice, (2) forming a large number of fine cracks in at least the amorphous phase or crystalline phase, (3) forming deficiencies by eluting cordierite constituent elements or impurities by a liquid phase method, (4) chemically or physically forming deficiencies by a vapor phase method, and (5) containing a substance having the ability to occlude oxygen. In the present invention, catalyst components can be loaded directly without coating with gamma alumina by forming at least a predetermined number of these pores. In addition, since pores formed by these methods do not destroy the ceramic crystal lattice as compared with that in the prior art, compression strength in the direction of the flow path can be made to be 10 MPa or more and the coefficient of thermal expansion can be made to be $1 \times 10^{-6}/°$ C. or less even if the cell wall thickness is reduced.

The following provides an explanation of a cordierite honeycomb structure imparted catalyst supporting ability using these methods. An explanation is first provided regarding a cordierite honeycomb structure having oxygen defects or lattice defects (metal vacancies, lattice strain) in a cordierite crystal lattice of the above-mentioned method (1). Defects capable of loading of catalyst components consist of oxygen defects and lattice defects. Among these, oxygen defects are defects that are formed due to a shortage of oxygen for composing the cordierite crystal lattice, and catalyst components can be loaded in pores formed by the escape of oxygen. It is preferable that the amount of oxygen contained in the honeycomb structure be less than 47% by weight to enable loading of the required amount of catalyst components.

Lattice defects are lattice defects that are formed as a result of incorporating an amount of oxygen that is greater than the amount required to constitute the cordierite crystal lattice, and catalyst components can be loaded in pores formed due to strain in the crystal lattice and metal vacancies. More specifically, the amount of oxygen contained in the honeycomb structure is preferably greater than 48% by weight. A cordierite honeycomb structure having defects in the crystal lattice can be produced by adjusting the burning atmosphere of the honeycomb structure or by using a specific starting raw material. Oxygen defects can be formed by: 1) reducing the pressure of the burning atmosphere or creating a reducing atmosphere for the burning atmosphere, 2) using a compound that is free of oxygen for at least a portion of the raw materials for cordierite conversion and burning in a low oxygen concentration atmosphere, or 3) substituting a portion of at least one type of constituent element of the cordierite other than oxygen with an element having a smaller valence than that element. In addition, lattice defects can be formed by: 4) substituting a portion of a constituent element of the cordierite other than oxygen with an element having a larger valence than that element.

The following provides an explanation of these methods for forming defects. First, in the case of producing a cordierite honeycomb structure having oxygen defects using the above-mentioned method 1), a material typically used as a cordierite conversion raw material such as talc ($Mg_3Si_4O_{10}(OH)_2$), kaolin ($Al_2Si_2O_5(OH)_4$), kaolin calcination product (calcined kaolin), alumina ($Al_2O_3$) or aluminum hydroxide ($Al(OH)_3$) can be used as the starting raw material. In addition to these compounds, an oxide or hydroxide containing at least one type of a constituent element of cordierite in the form of Si, Al and Mg can be used as an Si source, Al source and Mg source.

These cordierite conversion raw materials are formulated so as to have the above-mentioned theoretical composition followed by the addition of binder, lubricant, moisturizer or other molding assistant and water, kneading and extrusion molding to mold into a honeycomb shape. After heating this molded product in air to about 500° C. or higher and degreasing, it is burned in an atmosphere under reduced pressure or in a reducing atmosphere to obtain a honeycomb structure. In the case of burning in an atmosphere under reduced pressure, the degree of vacuum is preferably about 4000 Pa (30 Torr) or less, and burning is normally carried out at about 1350° C. or higher and held at that temperature for 2 hours or more.

Since the oxygen contained in the raw materials leaves as a gas in the reaction process during burning as a result of burning in an atmosphere under reduced pressure, there is a shortage of oxygen for composing cordierite crystals, and oxygen defects are formed in the cordierite crystal lattice. In addition, the same is true in the case of burning in a reducing atmosphere. Namely, when burned under the same conditions as previously described in hydrogen or other reducing gas atmosphere, the oxygen contained in the raw materials escapes by reacting with the reducing gas in the reaction process during burning. Consequently, there is a shortage of oxygen for composing the cordierite crystals and oxygen defects are formed in the cordierite crystal lattice. In the case of only using an oxide for the cordierite conversion raw material, since it is possible to compensate for the oxygen for composing the cordierite crystals with only the oxygen contained in the raw material, it is necessary to remove the oxygen from the atmosphere under reduced pressure or the reducing atmosphere.

In the case of producing a cordierite honeycomb structure having oxygen defects using the above-mentioned method 2), a compound that contains at least one type of Si, Al and Mg but does not contain oxygen is used for at least a portion of the Si source, Al source and Mg source serving as the cordierite conversion raw material. Examples of these compounds include nitrides, fluorides, chlorides or other halides containing at least one type of Si, Al and Mg that is a constituent element of the cordierite, and should be the above-mentioned compounds in which all or a portion of at least one type of Si source, Al source and Mg source does not contain oxygen. The same raw materials as the above-mentioned method 1) can be used for the other cordierite conversion raw materials.

This cordierite conversion raw material is formulated so as to have the above-mentioned theoretical composition, and after molding into a honeycomb shape and degreasing in the same manner as method 1), it is burned in an atmosphere having a low oxygen concentration. The concentration of oxygen in the atmosphere is 0 to less than 3% and preferably 0% to 1% or less, and as a result, oxygen defects are formed in the cordierite crystal lattice. If a compound that does not contain oxygen is used for the cordierite conversion raw material, there is a shortage of oxygen for composing the cordierite crystals with only the oxygen contained in the raw materials. Therefore, although the deficient oxygen is attempted to be replenished from the burning atmosphere, due to the low oxygen concentration of the burning atmosphere, the required amount of oxygen for composing the cordierite crystals in the reaction process is unable to be adequately supplied, and lattice defects are formed in the cordierite crystal lattice.

In this manner, in the case of using a compound free of oxygen as a cordierite conversion raw material, instead of burning in a low oxygen concentration atmosphere, burning can also be carried out in an atmosphere under reduced pressure or reducing atmosphere as in method 1). In this case as well, since the required amount of oxygen for composing cordierite crystals in the reaction process is unable to be adequately supplied, oxygen defects are formed in the cordierite crystal lattice. In the above-mentioned method 3), oxygen defects are formed by substituting at least a portion of the Si, Al and Mg serving as constituent elements of the cordierite with an element having a smaller valence than that element. In the case of producing a cordierite honeycomb structure according to this method, instead of Si, Al and Mg that are constituent elements of the cordierite, a cordierite conversion raw material is used in which at least a portion of the Si source, Al source and Mg source is substituted with a compound containing an element having a smaller valence than those elements is used.

Since the valences of the constituent elements of cordierite are 4+ for Si, 3+ for Al and 2+ for Mg, respectively, a portion of at least one type thereof should be a compound containing an element having a smaller valence than those elements. Oxides, hydroxides, nitrides or halides may be used for these compounds, and ordinary materials are used for other Si, Al and Mg sources to prepare the cordierite conversion raw material. After molding this into a honeycomb shape using similar methods, the molded product is degreased and burned. The burning atmosphere may be an atmosphere under reduced pressure, reducing atmosphere, air atmosphere or other oxygen-containing atmosphere or oxygen-free atmosphere. Since the oxygen required to constitute the cordierite is contained in the raw materials and oxygen defects are the result of oxygen substitution, oxygen defects are formed over an oxygen concentration range of 0 to 100% without being affected by the oxygen concentration.

The constituent elements of cordierite all have positive charges, namely 4+ for Si, 3+ for Al and 2+ for Mg. When these are substituted with elements having a smaller valence, there is a shortage of positive charge equivalent to the difference in valence with the substituted element and the substituted amount, and oxygen (2−) having a negative charge is released to maintain the electrical neutrality of the crystal lattice. In this manner, oxygen defects are also formed in the cordierite crystal lattice by substituting the constituent elements of cordierite with elements having a smaller valence. In the above-mentioned method 4), lattice defects are formed by substituting at least a portion of the constituent elements of cordierite in the form of Si, Al and Mg with an element having a larger valence than those elements. In the case of producing a cordierite honeycomb structure according to this method, a cordierite conversion raw material is used in which, instead of the Si, Al and Mg which are constituent elements of the cordierite, a portion of the Si, Al and Mg sources are substituted with a compound having a larger valence than these elements.

In this case as well, a cordierite conversion raw material is prepared-by using a compound containing an element having a larger valence than Si, Al and Mg for a portion of at least one type of Si, Al and Mg, and using an ordinary raw material for other Si, Al and Mg sources. After molding this into a honeycomb shape using similar methods, the molded product is degreased and burned. In method 4), it is necessary for the burning atmosphere to be an atmosphere in which oxygen is adequately supplied such as an air atmosphere. Furthermore, in the case the burning atmosphere is an air atmosphere, since degreasing is possible during burning, the degreasing step can be omitted. Conversely, if constituent elements of cordierite are substituted with an element having a larger valence, there is an excess positive charge equivalent to the difference in valence with the substituted element and the substituted amount, and the required amount of oxygen (2−) having a negative charge is incorporated to maintain electrical neutrality of the crystal lattice. This incorporated oxygen serves as an obstruction that prevents the cordierite crystal lattice from being arranged in a regular manner, thereby resulting in the formation of lattice defects.

In the case oxygen defects are formed in the cordierite crystal lattice, the amount of oxygen contained in the unit crystal lattice of the cordierite becomes less than that of a unit crystal lattice that does not have oxygen defects. In addition, since the crystal lattice deforms so that portions from which oxygen has escaped are crushed, the lattice constant of the $b_0$ axis of the crystal axes of the cordierite becomes smaller. On the other hand, in the case lattice defects are formed in the cordierite crystal lattice, the amount of oxygen contained in the unit crystal lattice of the cordierite becomes greater than that of a unit crystal lattice that does not have lattice defects, and the lattice constant of the $b_0$ axis changes. More specifically, if the amount of oxygen of the honeycomb structure becomes less than 47% by weight due to the formation of oxygen defects, the number of oxygen contained in the cordierite unit crystal lattice becomes smaller than 17.2, and the lattice constant of the $b_0$ axis of the crystal axes of cordierite becomes smaller than 16.99.

In addition, if the amount of oxygen of the honeycomb structure exceeds 48% by weight due to the formation of lattice defects, the number of oxygen contained in the cordierite unit crystal lattice becomes larger than 17.6 and the lattice constant of the $b_0$ axis of the crystal axes becomes smaller or larger than 16.99. As has been described above, in the present invention, a required amount of catalyst components can be loaded onto a cordierite honeycomb structure due to the presence of oxygen defects or lattice defects formed in the cordierite crystal lattice. Furthermore, since the size of these defects is considered to be several angstroms or less, specific surface area cannot be measured with ordinary methods for measuring specific surface area in the manner of BET that use nitrogen molecules.

The following provides an explanation of a cordierite honeycomb structure having a large number of fine cracks in at least the amorphous phase or crystalline phase of the above-mentioned method (2). Since these fine cracks are formed in the amorphous phase or crystalline phase by 1) imparting thermal shock or 2) imparting shock waves to the cordierite honeycomb structure, catalyst components can be loaded in the large number of pores formed as a result of this. It is necessary for the width of the cracks to be equal to or greater than the diameter of catalyst component ions in order to load a catalyst component, and is normally 0.1 nm or more, while the depth is required to be ½ or more the diameter of catalyst component ions, and is normally 0.05 nm or more. It is preferable that the cracks be as small as possible to ensure the strength of the honeycomb structure, and normally have a width of about 100 nm or less, and preferably have a width of about 10 nm or less.

A method in which the cordierite honeycomb structure is heated and then cooled rapidly is used as a method for imparting thermal shock of the above-mentioned method 1). Thermal shock should be imparted to the cordierite honeycomb structure after the cordierite crystalline phase and amorphous phase have formed, and after molding and degreasing the cordierite conversion raw material containing an Si source, Al source and Mg source using ordinary methods, the cordierite honeycomb structure obtained after burning is reheated to a predetermined temperature followed by cooling rapidly, or a method can be employed in which it is rapidly cooled from a predetermined temperature in the process of cooling after burning. In order to form cracks by thermal shock, the difference between the heating temperature and rapid cooling temperature (temperature difference for thermal shock) should normally be about 80° C. or more, and the size of the cracks increases as the temperature difference for thermal shock becomes larger. However, since it is difficult to maintain the shape of the honeycomb structure if the cracks become excessively large, the temperature difference for thermal shock is preferably about 900° C. or less.

The amorphous phase is present in the form of a layer surrounding the crystalline phase in a cordierite honeycomb structure. If a thermal shock is imparted by heating and then rapidly cooling the cordierite honeycomb structure, thermal stress equivalent to the difference in the coefficient of thermal expansion and the temperature difference for thermal shock acts in the vicinity of the interface between the amorphous phase and the crystalline phase since there is a difference in the coefficient of thermal expansion between the amorphous phase and the crystalline phase. Fine cracks form if the amorphous phase or crystalline phase is unable to withstand this thermal stress. In addition, the amount of fine cracks formed can be controlled according to the amount of amorphous phase present in the cordierite honeycomb structure. Since fine cracks are formed in the vicinity of the interface between the amorphous phase and the crystalline phase, the greater the amount of the amorphous phase, the larger the number of fine cracks formed.

The amorphous phase present in the cordierite honeycomb structure is considered to be the result of the formation of amorphous phase due to the action of flux during burning of the honeycomb by alkaline meal elements and alkaline earth metal elements contained in trace amounts in the cordierite raw material. Consequently, the amount of the amorphous phase can be increased and the amount of fine cracks that form when imparting thermal shock can be increased by adding alkaline metal elements and alkaline earth metal elements. In addition, the amount of fine cracks formed can be controlled according to the amount of alkaline metal elements and alkaline earth metal elements added at this time. In order to obtain the effects of this addition, the amount of alkaline metal elements and alkaline earth metal elements contained as impurities in the raw material should normally be 0.05% by weight or more as the total of alkaline metal elements and alkaline earth metal elements contained in the cordierite honeycomb structure. Furthermore, these alkaline metal elements and alkaline earth metal elements can be added as compounds that contain alkaline metal elements and alkaline earth metal elements such as oxides, hydroxides and carbonates.

Fine cracks can also be formed in the amorphous phase or crystalline phase by a method in which a shock wave is imparted of Method 2) instead of thermal shock. In this case, fine cracks form when those portions within the honeycomb structure having low strength are no longer able to withstand the energy of the shock wave. Ultrasonic waves or vibrations can be employed to impart shock waves, the amount of fine cracks formed can be controlled by the energy of the shock waves. A large number of fine cracks can be formed in at least the amorphous phase or the crystalline phase as described in (2) in a honeycomb structure in which oxygen defects or lattice defects have formed in the cordierite crystal lattice as described in (1) above.

In this case, after burning a honeycomb structure having oxygen defects or lattice defects according to the method indicated in (1) above and in which the amount of oxygen is less than 47% by weight or in excess of 48% by weight and the lattice constant of the $b_0$ axis of the crystal axes is greater than or less than 16.99, by imparting thermal shock or shock waves according to the method described in (2), a cordierite honeycomb structure can be obtained having at least one type of oxygen defect or lattice defect and a large number of fine cracks. The total number of oxygen defects, lattice defects and fine cracks for loading the required amount of catalyst component is $1 \times 10^7$/L or more, and preferably $1 \times 10^8$/L or more. Fine cracks can be formed in the amorphous phase or crystalline phase by a method that imparts shock waves of 2).

Next, an explanation is provided of a cordierite honeycomb structure in which deficiencies are formed by eluting cordierite constituent elements and impurities according to the liquid phase method of (3) above. These deficiencies are formed by eluting metal elements such as Mg or Al in the cordierite crystal, alkaline metal elements or alkaline earth metal elements contained in the amorphous phase, or eluting the amorphous phase itself into high-temperature, high-pressure water, a supercritical fluid or alkaline solution or other solution, and catalyst components can be loaded into the pores formed by deficiencies of these elements and so forth.

A cordierite honeycomb structure is obtained by molding and degreasing a cordierite raw material containing an Si source, Al source and Mg source using ordinary methods followed by burning in air, and this cordierite honeycomb structure is immersed in high-temperature, high-pressure water, a supercritical fluid or an alkaline solution. As a result, metal elements such as Mg and Al in the cordierite crystal, alkaline metal elements and alkaline earth metal elements contained in the amorphous phase, or the amorphous phase itself elute into these solutions and pores are formed. The size of the pores can be controlled according to the temperature and pressure of the solution, solvent and so forth, and more specifically, high-temperature, high-pressure water at 10 MPa and 300° C., a supercritical fluid of $CO_2$, or a solution such as aqueous sodium hydroxide or other alkaline solution is used. In addition, since the amorphous phase that is formed can be adjusted by adding alkaline metal elements or alkaline earth metal elements to the cordierite raw material as previously described, pores can also be controlled by adjusting the amounts added thereof.

Next, an explanation is provided of a cordierite honeycomb structure in which deficiencies are formed chemically and/or physically using the vapor phase method of the above-mentioned (4). Pores are formed by dry etching or sputter etching a cordierite honeycomb structure. In the case of dry etching, a reaction gas is excited by causing it to discharge using high-frequency waves and so forth. When the Si, Al and Mg of the constituent elements of the cordierite react with this reaction gas, volatile substances are formed and the cordierite is etched as a result of these substances volatilizing and being discharged. In this manner, those portions where the cordierite is chemically etched become pores and enable catalyst loading. A gas such as $CF_4$ is used for the reaction gas, and a volatile substance such as $SiF_4$ is formed by its reaction with the cordierite constituent elements. The degree of dry etching can be controlled according to the duration of etching, type of reaction gas and energy supplied.

In the case of sputter etching, when a cordierite honeycomb structure is placed in a plasma such as Ar that has been excited with high-frequency waves, the Ar ions collide with the cordierite surface and atoms of the cordierite constituent elements or clusters of a plurality of atoms are blown off resulting in cordierite etching. In this manner, those portions where the cordierite is physically etched become pores enabling catalyst loading. The degree of sputter etching can be controlled according to the duration of etching, type of excited gas and energy supplied.

Next, an explanation is provided of a cordierite honeycomb structure containing a substance having the ability to occlude oxygen of the above-mentioned (5). Substances such as $CeO_2$ having the ability to occlude oxygen allow oxygen to be exchanged accompanying changes in the oxygen concentration of the atmosphere. In other words, although the valence of Ce is 4+ in the case of an atmosphere having a high oxygen concentration, the valence becomes 3+ if the oxygen concentration decreases, and since electrical neutrality is disturbed due to the change in valence, electrical neutrality is maintained by release or absorbing oxygen. Substances having such an ability to occlude oxygen have conventionally been used as promoters in three-way catalysts, and have the action of adjusting the air-fuel ratio to the vicinity of the theoretical air-fuel ratio by exchanging oxygen corresponding to fluctuations in the oxygen concentration of exhaust gas.

In this manner, if Ce, which is able to adopt a plurality of valences, is contained in a cordierite honeycomb structure in a form in which it substitutes constituent elements of the cordierite, oxygen excesses or shortages occur as a result of compensating for changes in valence in the same manner as the case of (1) above, and oxygen defects or lattice defects are formed in the crystal lattice of the cordierite. Since these oxygen defects or lattice defects become pores, simultaneous to catalyst loading, the ability to occlude oxygen can be imparted to the cordierite honeycomb structure. Namely, a catalyst can be loaded directly without coating with gamma alumina, and the ability to occlude oxygen can be realized without having to separately load a promoter having the ability to occlude oxygen. In order to impart this ability to occlude oxygen, the content of $CeO_2$ in the cordierite honeycomb structure is preferably 0.01% by weight or more.

Ce is made to substitute a portion of at least one type among the Si, Al and Mg serving as constituent elements of the cordierite in order to obtain a cordierite honeycomb structure containing $CeO_2$. The substitution method is the same as in the case of (1) above, and a cordierite raw material should be used in which a portion of the Si source, Al source or Mg source is substituted with a compound containing Ce instead of Si, Al or Mg. Since the valence of Ce is normally 4+ in air, in addition to lattice defects naturally being formed in the same manner as in 4) of the above-mentioned (1) in the case of substituting for Mg (2+) or Al (3+) having a smaller valence, since a portion of the Ce normally has a valence of 3+, pores are also formed by oxygen defects even if substituted for Si(4+).

In this manner, a cordierite honeycomb structure having the ability to load a catalyst and the ability to occlude oxygen can be obtained by using Ce as a substituent. Although there is the risk of the oxygen occluding ability decreasing due to particle growth caused by deterioration of $CeO_2$ in the case of loading $CeO_2$ onto a support as a promoter, since there is no occurrence of particle growth in the case of containing $CeO_2$ in the cordierite structure, there is no decrease in oxygen occluding ability. In addition, fine cracks may also be formed by imparting thermal shock or shock waves as described in (2) above after burning the cordierite honeycomb structure. As a result, the number of pores formed can be increased and catalyst loading ability can be improved. Alternatively, the number of oxygen defects or lattice defects formed can be adjusted by combining the methods indicated in (1) above, using a substituent other than Ce or adjusting the burning atmosphere.

Furthermore, oxygen occluding ability can be imparted to a cordierite honeycomb structure that has been given catalyst loading ability by the methods of (1) to (4) above by loading a promoter such as $CeO_2$ having the ability to occlude oxygen. In this case, since the promoter can be loaded by using the pores of the cordierite honeycomb structure without coating with gamma alumina, a cordierite honeycomb structure can be easily obtained having both catalyst loading ability and oxygen occluding ability. In the case of loading a promoter having the ability to occlude oxygen, loading may be carried out by loading ions or complexes serving as preliminary substances of the promoter followed by heat treatment.

Moreover, in a ceramic body of the present invention, catalyst components can be loaded directly onto substituents by substituting at least one or more types of elements among those elements that constitute the base material ceramic with elements other than the constituent elements. Ceramic catalyst bodies obtained by direct loading of catalyst components are preferably used, for example, as exhaust gas purification catalysts for automobiles. A ceramic containing as a component thereof cordierite for which the theoretical composition is represented by $2MgO.2Al_2O_3.5SiO_2$ is preferably used for the base material ceramic. More specifically, a ceramic body containing 1% by volume or more, and preferably 5% by volume or more, of cordierite is used preferably. There are no particular limitations on the form of the ceramic body, and it can have various forms such as a honeycomb, foam, hollow fiber, fiber, powder or pellet.

Elements having bonding strength with loaded catalyst components that is greater than that of the constituent elements of the base material ceramic (Si, Al and Mg) and are able to load catalyst components by chemical bonding are used for those elements substituted for the constituent elements of the base material ceramic. Specific examples of such substituents include one or more types of elements that serve as these constituent elements and have a d or f orbital in the electron orbitals thereof. Elements having a vacant d or f orbital or have two or more oxidation states are used preferably. Since elements having a vacant d or f orbital easily donate electrons since the energy level is close to that of the precious metal catalyst and so forth loaded, they easily bond with catalyst components. In addition, elements having two or more oxidation states demonstrate a similar action since they also easily donate electrons.

Specific examples of substituents having a vacant d or f orbital include Sc, Ti, V, Cr, Mn, Fe, Co, Ni, Y, Zr, Nb, Mo, Tc, Ru, Rh, La, Ce, Pr, Nd, Pm, Sm, Eu, Gd, Tb, Dy, Ho, Er, Tm, Lu, Hf, Ta, W, Re, Os, Ir and Pt, and preferably at least one or more types of elements are used selected from Ti, V, Cr, Mn, Fe, Co, Ni, Zr, Mo, Ru, Rh, Pd, Ce, W, Os, Ir and Pt. Furthermore, among these elements, Ti, V, Cr, Mn, Fe, Co, Ni, Nb, Mo, Tc, Ru, Rh, Ce, Pr, Eu, Tb, Ta, W, Re, Os, Ir and Pt have two or more oxidation states.

In addition, specific examples of other elements having two or more oxidation states include Cu, Ga, Ge, As, Se, Br, Pd, Ag, In, Sn, Sb, Te, I, Yb, and at least one or more types of elements selected from Au, and Cu, Ga, Ge, Se, Pd, Ag and Au are used preferably. Since a cordierite porous body having high specific surface area serving as a ceramic base material of the present invention is composed only of a needle-shaped crystalline phase, and adopts a structure that inhibits the progression of sintering, decreases in specific surface area caused by sintering as a result of heat treatment at high temperatures can be inhibited. On the basis of this, a honeycomb structure serving as a catalyst support can be produced directly from a cordierite porous body having high specific surface area that is stable at high temperatures that serves as a ceramic body of the present invention.

Namely, as a result of producing a honeycomb structure serving as a catalyst support directly from a cordierite porous body having high specific surface area that is stable at high temperatures that serves as a ceramic body of the present invention, steps such as coating of gamma alumina can be omitted from the conventional process for producing honeycomb structures, and the production costs of honeycomb structures for catalyst loading can be reduced considerably. In the present invention, by using the above-mentioned cordierite porous body having high specific surface area that is stable at high temperatures as a honeycomb structure for catalyst loading, the problem of the prior art of deterioration of catalyst quality attributable to separation of the gamma alumina coating layer as a result of use for extended periods of time can be eliminated.

In addition, in the present invention, the production process of a honeycomb catalyst can be simplified by using the above-mentioned cordierite porous body having high specific surface area that is stable at high temperatures as a honeycomb structure for catalyst loading. Since the cordierite porous body having high specific surface area that is stable at high temperatures of the ceramic body base material of the present invention is composed of a microscopic needle-shaped crystalline phase of 1 nanometer or more and 0.1 microns or less, it is able to easily load active catalysts such as Pt, Ph and Pd.

Namely, in the present invention, a honeycomb structure loaded with a precious metal catalyst can be produced and provided at low cost by using the above-mentioned cordierite porous body having high specific surface area that is stable at high temperatures as a honeycomb structure for catalyst loading. Since the cordierite porous body of the present invention is composed entirely of a needle-shaped crystalline phase, decreases in specific surface area caused by sintering can be inhibited even during heat treatment at high temperatures, and since it can be produced directly as a honeycomb structure having large specific surface area, it can be preferably used, for example, as a cordierite porous body for catalyst loading having high specific surface area that is stable at high temperatures.

A cordierite honeycomb structure having catalyst loading ability fabricated according to the above-mentioned method is preferably used as a ceramic support used in, for example, catalysts for exhaust gas purification of internal combustion engines. This ceramic support is able to load, for example, 0.1 g/L or more of catalyst components into the pores of the cordierite honeycomb structure without coating with gamma alumina, thereby allowing the obtaining of a ceramic catalyst body having low heat capacity, high thermal shock resistance and low pressure loss. At least one type of metal having catalytic abilities or oxide of a metal having catalytic abilities is used for the catalyst component. Precious metals such as Pt, Pd and Rh are used as metals having catalytic abilities, while oxides containing at least one metal among, for example, V, Nb, Ta, Cr, Mo, W, Mn, Fe, Co, Ni, Cu, Zn, Ga, Sn and Pb are used as oxides of metals having catalytic abilities. In addition, one or more types of lanthanoid elements, transition metal elements, alkaline metal elements, alkaline earth metal elements or oxides and compound oxides thereof can be simultaneously used as promoters.

In addition to the liquid phase method in which a catalyst component is dissolved in a solvent and impregnated into a cordierite honeycomb structure so as to load the catalyst component into pores such as defects or cracks, other methods for loading a catalyst component include CVD, PVD and other vapor phase methods as well as methods using a supercritical fluid. In the present invention, since pores such as defects or cracks are formed in the cordierite honeycomb structure, it is preferable to use a method that uses a solvent that is able to easily penetrate into micro pores in the manner of a vapor phase method or methods that use a supercritical fluid. Although water can be used for the solvent in vapor phase methods, it is preferable to use an alcohol-based solvent such as methanol that has smaller surface tension than water.

The use of a solvent that has smaller surface tension than water enables adequate penetration into the pores. At this time, if the honeycomb structure is immersed while imparting vibrations or while degassing in a vacuum, the solvent is more easily able to penetrate into the pores. In addition, catalyst components may also be loaded to the required amount by dividing into multiple loadings having the same composition or different compositions. The use of these methods makes it possible to load 0.5 g/L or more of catalyst component by more effectively utilizing the pores. A catalyst-ceramic body of the present invention produced in this manner has superior purification performance in which the required amount of catalyst component is loaded directly and at narrow intervals without forming a gamma alumina coating layer on the surface of the ceramic support.

The present invention demonstrates the following extraordinary effects. 1) Needle-shaped ceramic body and needle-shaped catalyst-ceramic body can be provided that are comprised of a cordierite porous body having high specific surface area. 2) Since at least a portion of this cordierite porous body is composed of a needle-shaped crystalline phase, decreases in specific surface area caused by sintering are inhibited even if exposed to high temperatures in excess of, for example, 1000° C. for an extended period of time. 3) A honeycomb body can be produced directly with a cordierite sintered compact itself. 4) This porous body is useful as a cordierite honeycomb structure for supporting a catalyst having high specific surface area that is stable at high temperatures. 5) Conventional steps of coating the inside of the honeycomb can be omitted. 6) A new production technology can be provided that enables the production of high-quality honeycomb bodies at low cost. 7) Although products coated, for example, with gamma alumina and the like on the inner walls of a cordierite honeycomb body using a method of the prior art had the problem of difficulty in maintaining high specific surface area due to the shift of gamma alumina to alpha alumina at 1000° C. or higher and the progression of sintering thereof, products of the present invention are free of this problem.

DESCRIPTION OF THE PREFERRED EMBODIMENTS

Although the following provides a detailed explanation of the present invention based on its examples, the present invention is not limited to these embodiments.

EXAMPLE 1

In the present embodiment, a ceramic body having needle-shaped particles was produced from a raw material blended with $SrF_2$. Kaolin (KCM Corp., Japan), talc (Japan Pure Chemical Co., Ltd., Japan), aluminum hydroxide ($Al(OH)_3$, Japan Pure Chemical Co., Ltd.) and silica (silica quartz, d 50 to 0.8 microns, Japan Pure Chemical Co., Ltd., Japan) were used as starting materials. According to a phase diagram of $MgO$—$Al_2O_3$—$SiO_2$, a cordierite phase having a stoichiometric composition ($2Al_2O_3 \cdot 2MgO \cdot 5SiO_2$) can be formed from a raw material powder. $SrF_2$ was added at 3% by weight to promote the formation of whiskers. The raw material powder was mixed with a ball mill for 24 hours in ethanol. After drying the mixed slurry at 75° C. with a rotary evaporator, the dried slurry was additionally dried in a drying oven at 110° C. The dried powder was then crushed and passed through a sieve having a pore size of 100 microns. This powder was molded with a metal mold at 100 MPa to obtain a pellet-shaped sample having a diameter of 20 mm and thickness of 7 mm. This pellet was burned for 4 hours over a temperature range of 1100 to 1400° C. The heating rate was 5° C./min. The whiskers that formed were needle-shaped particles having a rounded tip.

EXAMPLE 2

Figure 1:
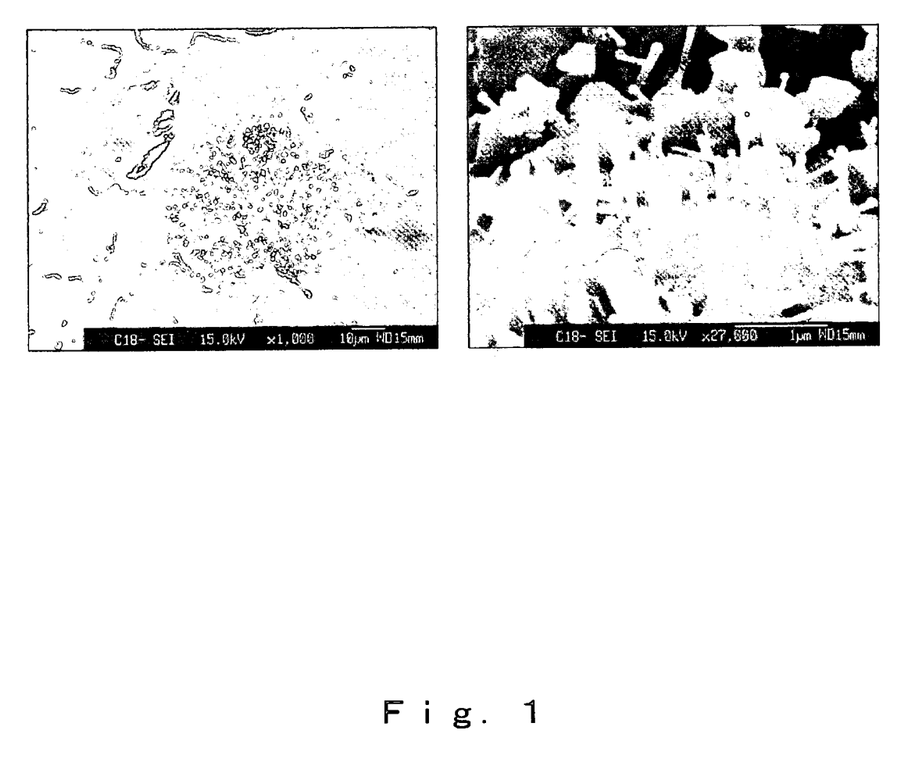
FIG. 1 shows a group of needle-shaped cordierite particles and their form grown on a metal catalyst; and, FIG. 2 shows an enlarged view of a group of needle-shaped cordierite particles grown on a metal catalyst.
Figure 2:
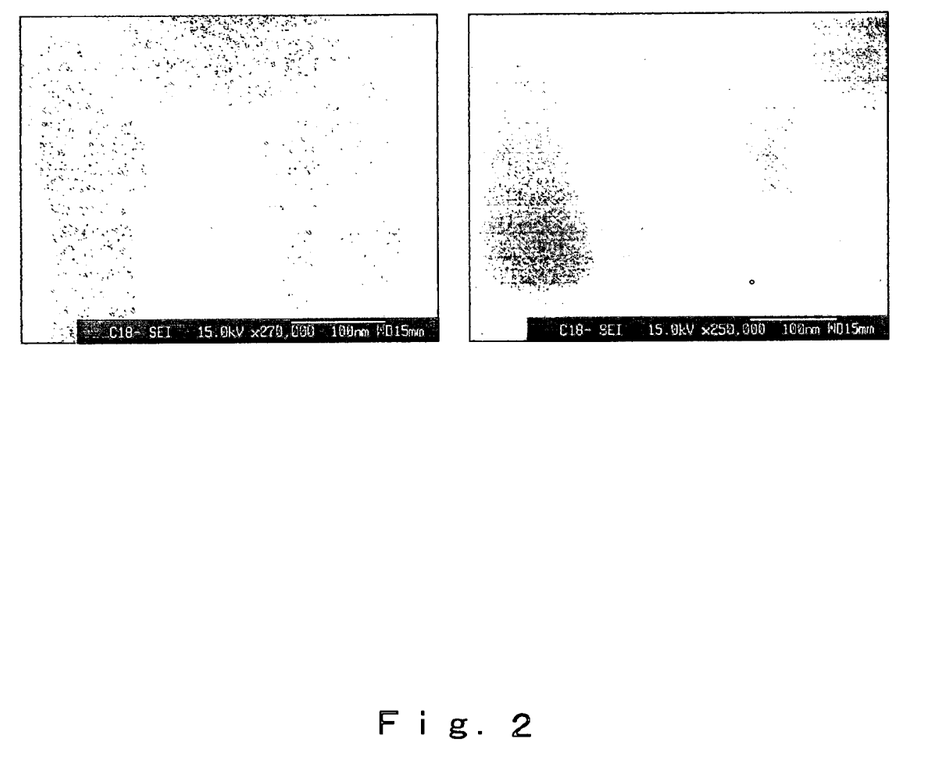

When the structures of pellets burned at respective temperatures after changing the burning temperature were observed, those pellets burned for 4 hours at 1350° C. or higher demonstrated prominent whisker formation. Based on the results of observing the pellet structure, the formation of whiskers was presumed to have occurred by a VLS mechanism. A typical example of the structure is shown in FIG. 1. As a result of EDX analysis, the whiskers were determined to have a cordierite composition. In addition, iron was determined to be contained in the tips of the whiskers. As a result, the impurity iron contained in the kaolin was presumed to have fulfilled the role of a metal catalyst that promotes whisker formation. This is because $SrF_2$ reacts with $Al_2O_3$ and $SiO_2$ to form AlOF and $SiF_4$. Due to the high vapor pressure of AlOF and $SrF_2$, crystals grow directly on the metal catalyst. As a result of this process, a vapor containing F formed from decomposed $SrF_2$ is thought to be related to whisker formation as shown in FIG. 1.

EXAMPLE 3

A honeycomb was fabricated by an extrusion molding process using the same components as Example 1. As a result of cutting out a test piece from the resulting honeycomb and observing with a scanning electron microscope (SEM), needle-shaped bodies were formed on the surface in the same manner as the case of having molded into pellets, and on the basis of the results of EDS analysis, Si, Mg and Al were detected, thereby demonstrating that the resulting honeycomb was cordierite.

In the case a portion of a gasified raw material was used to grow needle-shaped particles on a metal catalyst, the increase in specific surface area was observed to be several times to several tens of times that of a base material on which needle-shaped particles are not formed. This is because of the increase in the catalyst loading surface area on the surface of the particles resulting from making the tips of the needle-shaped particles spherical. In addition, since the tips of the needle-shaped particles are the portion that is exposed the greatest to the gas, the catalyst is allowed to function more effectively and catalyst performance can be improved by loading numerous catalyst fine particles on the tips of these needle-shaped particles.

As has been described in detail thus far, the present invention relates to a ceramic body, a ceramic support having the ability to support catalyst, a catalyst-ceramic body and production methods thereof. According to the present invention, by growing a portion of a gasified raw material into a needle like shape on a metal catalyst due to reactions among raw materials in a burning process, a ceramic body can be produced and provided that contains a large number of needle-shaped particles having rounded tips. In addition, by growing a needle-shaped ceramic body on the surface of a sintered compact, a cordierite porous body with a high specific surface area can be produced and provided having a structure in which a nanometer-order needle-shaped crystalline phase has precipitated. In this case, the shape and properties of the resulting needle-shaped particles can be controlled according to the substance for gasifying the raw material, catalyst, raw material composition, slurry concentration, treatment conditions and so forth.

In the present invention, since the entire cordierite porous body of the base material of a ceramic body is composed of a needle-shaped crystalline phase, decreases in specific surface area due to sintering can be dramatically inhibited even if heat treated at high temperatures. This being the case, in the production of a cordierite honeycomb structure for catalyst loading, a step such as the coating of gamma alumina onto the honeycomb inner walls can be omitted. A technology can be provided that allows the production of a cordierite honeycomb having high specific surface area that is able at high temperatures. In addition, the present invention provides a needle-shaped ceramic body composed of a cordierite porous body having a high specific surface area, a production method thereof, and a needle-shaped catalyst-ceramic body that is a product thereof, and is useful by providing these new technologies in the relevant technical fields.

What is claimed is:

1. A ceramic body consisting essentially of whisker grown needle-shaped crystalline phase comprising ceramic particles having a needle shape in which at least a portion of the ceramic particles comprise Si, Al and Mg, the needle-shaped ceramic particles comprise a tip having a spherical shape and a body portion that supports the tip, and the diameter of the tip having a spherical shape is larger than the diameter of the body portion, wherein the ceramic body has at least pores or elements capable of directly supporting a catalyst component on the surface of ceramic particles of the ceramic body, wherein the pores are comprised of at least one of defects in a ceramic particle crystal lattice, fine cracks in a ceramic particle surface and deficiency of an element that constitutes ceramic particles, and wherein 1% by weight or less of Fe is contained in the tip of the ceramic particles.

2. A ceramic body consisting essentially of whisker grown needle-shaped crystalline phase comprising ceramic particles having a needle shape, and comprising at least Si, Al and Mg as a coating layer on a portion or the entirety of the surface of the ceramic body, and the tips of the needle-shaped ceramic particles are rounded, and wherein 1% by weight or less of Fe is contained in the tip of the ceramic particles.

3. A ceramic body consisting essentially of whisker grown needle-shaped crystalline phase comprising ceramic particles having a needle shape, comprising at least Si, Al and Mg as a coating layer on a portion or the entirety of the surface of the ceramic body, and having at least pores or elements capable of directly supporting a catalyst component on the surface of ceramic particles of the ceramic body, and the tips of the needle-shaped ceramic particles are rounded, and wherein 1% by weight or less of Fe is contained in the tip of the ceramic particles.

4. The ceramic body according to any of claim 1, 2 or 3, wherein Sr and B are contained in the ceramic body.

5. The ceramic body according to claim 3, wherein the pores are comprised of at least one of defects in a ceramic particle crystal lattice, fine cracks in a ceramic particle surface and deficiency of an element that constitutes ceramic particles.

6. The ceramic body according to claim 5, wherein said fine cracks are present and the width of the fine cracks is 100 nm or less.

7. The ceramic body according to claim 5, wherein the pores have a diameter or width of 1000 times or less the diameter of the catalyst ion supported, and the number of those pores is $1 \times 10^{11}$/L or more.

8. The ceramic body according to claim 5, wherein the pores are comprised of defects formed by substitution of a portion of the constituent elements of the ceramic body with a metal element of a different valence.

9. The ceramic body according to claim 8, wherein the defects are comprised of at least one type of oxygen defect and lattice defect, and ceramic crystals having one or more defects are contained at $4\times10^{-6}$% or more in the unit crystal lattice of the needle-shaped particles.

10. The ceramic body according to claim 3, wherein the catalyst component is supported onto a substituent element by chemical bonding.

11. The ceramic body according to claim 10, wherein the substituent element is at least one or more types of elements having a d or f orbital among the electron orbitals thereof.

12. The ceramic body according to any of claim 1, 2 or 3, wherein the needle-shaped particles comprise Si, Al and Mg, and at least one type of Sr and Ce.

13. The ceramic body according to any of claim 1, 2 or 3, wherein the needle-shaped particles are cordierite.

14. The ceramic body according to claim 13, wherein at least five unit crystal lattices from the surface of the needle-shaped particles are cordierite.

15. The ceramic body according to any of claim 1, 2 or 3, wherein the aspect ratio of the needle-shaped particles is 5 or more.

16. The ceramic body according to any of claim 1, 2 or 3, wherein the form of the ceramic body is a powder, pellet, non-woven fabric or honeycomb.

17. The ceramic body according to any of claim 1, 2 or 3, wherein the specific surface area of the ceramic body is 1 m$^2$/g or more.

18. The ceramic body according to claim 16, which is in the form of a ceramic honeycomb body having porosity of 10% or more.

19. The ceramic body according to claim 16, which is in the form of a ceramic honeycomb body having porosity of 30% or more.

20. The ceramic body according to claim 16, which is in the form of a ceramic honeycomb body in which the coefficient of thermal expansion in the direction of a flow path is $2\times10^{-6}$/° C. or less.

21. The ceramic body according to claim 16, which is in the form of a ceramic honeycomb body in which the coefficient of thermal expansion in the direction of a flow path is $1\times10^{-6}$/° C. or less.

22. The ceramic body according to claim 16, which is in the form of a ceramic honeycomb body in which the compression strength in the direction of a flow path is 5 MPa or more.

23. The ceramic body according to claim 16, which is in the form of a ceramic honeycomb body in which the compression strength in the direction of a flow path is 10 MPa or more.

24. The ceramic body according to claim 16, which is in the form of a ceramic honeycomb body in which the cell wall thickness is 400 μm or less.

25. The ceramic body according to claim 16, which is in the form of a ceramic honeycomb body in which the cell wall thickness is 100 μm or less.

26. The ceramic body according to claim 16, which is in the form of a ceramic honeycomb body in which the distribution width of pore distribution is narrow.

27. The ceramic body according to claim 26, wherein the pore volume in which the distribution width is contained within ±½ of the average pore diameter is 50% or more.

28. A ceramic catalyst body in which a catalyst component is supported onto the ceramic body according to any of claim 1, 2 or 3.

29. The ceramic catalyst body according to claim 28, wherein the catalyst component is a precious metal.

30. The ceramic catalyst body according to claim 29, wherein the supported amount of the catalyst component is 0.1 g/L or more.

31. A ceramic catalyst body comprising a promoter component in the ceramic body defined in any of claim 1, 2 or 3.

32. The ceramic catalyst body according to claim 31, wherein the promoter component is one or more types of a lanthanoid element, transition metal element, alkaline metal element, alkaline earth metal element or oxide or compound oxide thereof 33. The ceramic catalyst body according to claim 32, wherein the content of the promoter component is 6 g/L or more.

* * * * *